United States Patent
Bixby et al.

[15] 3,666,971
[45] May 30, 1972

[54] PULSE CONTROL DRIVE SYSTEM FOR POWER TRANSISTORS

[72] Inventors: Bryan J. Bixby, Pittsburgh; Derek A. Paice, Murrysville, both of Pa.

[73] Assignee: Westinghouse Electric Corporation, Pittsburgh, Pa.

[22] Filed: Sept. 24, 1970

[21] Appl. No.: 75,195

[52] U.S. Cl.............................307/282, 307/315, 331/112, 307/275
[51] Int. Cl. .......................................................H03k 3/30
[58] Field of Search ....................307/315, 282, 275; 331/112

[56] References Cited

UNITED STATES PATENTS 3,161,836 12/1964 Miller....................................331/112
3,523,235 8/1970 Schaefer................................331/112

FOREIGN PATENTS OR APPLICATIONS 178,857 3/1966 U.S.S.R. ................................307/275

Primary Examiner—Donald D. Forrer
Assistant Examiner—Harold A. Dixon
Attorney—F. H. Henson, C. F. Renz and A. S. Oddi

[57] ABSTRACT

A drive system for a power device, such as a power transistor, for supplying a load wherein an oscillator is provided including a pair of devices, such as transistors, coupled by a transformer, which may comprise a saturable transformer, wherein the oscillator devices are alternately conductive and are connected in a Darlington circuit arrangement with the power devices to supply drive current thereto when conductive.

9 Claims, 2 Drawing Figures

Patented May 30, 1972  3,666,971
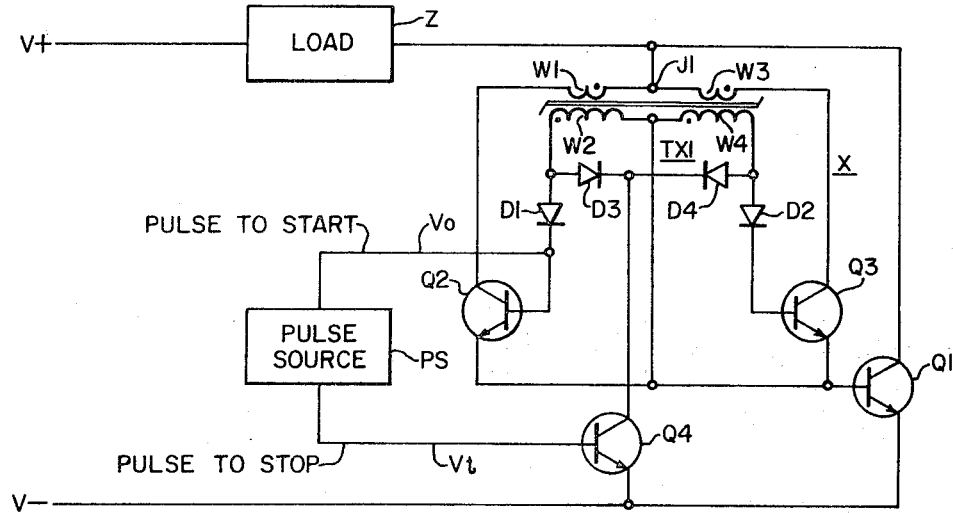
FIG.1.
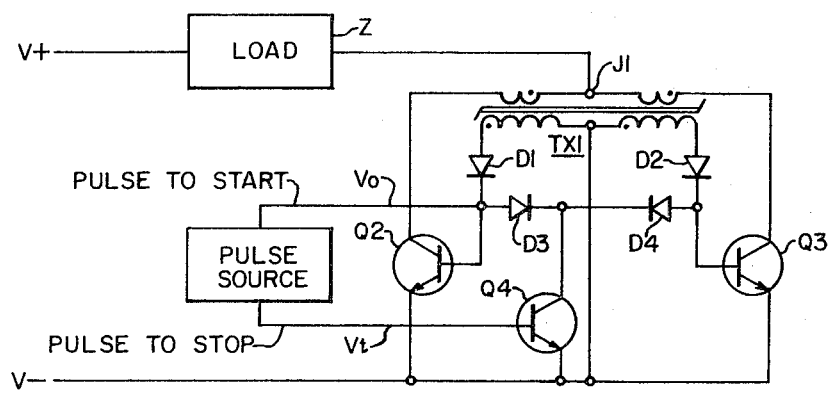
FIG.2.
WITNESSES
INVENTORS
Bryan J. Bixby
and Derek A. Paice
BY 
ATTORNEY

PULSE CONTROL DRIVE SYSTEM FOR POWER TRANSISTORS

BACKGROUND OF THE INVENTION

1. Field of the Invention

The present invention relates to drive systems for power devices and, more particularly, to drive systems wherein Darlington circuit arrangements are employed.

2. Description of the Prior Art

Among the many techniques for driving a power device, such as power transistor, is the so-called Darlington drive. In the Darlington drive the power transistor is supplied with base drive current from the collector-emitter circuit of a preceding driver transistor which, in turn, may receive base drive current from the collector-emitter circuit of another driver transistor. The first transistor in the Darlington chain is usually turned on by connecting the base electrode thereof via a resistor and switch to the operating source of the system. In this type of arrangement, at reduced levels of supply voltage the output current through the power device will be limited. Another technique for driving a power device is to connect one winding of a saturable transformer in the output circuit of the transistor and a suitably wound second winding in the input circuit thereof so that when the power device is turned on positive feedback will be provided to the input thereof to drive the power device quickly into full conduction. When the transformer saturates the power device will turn off with the decay of flux causing reversal of current flow in the input circuit of the power device. This arrangement has the disadvantage of requiring a relatively large current input pulse for turning on the power device. Moreover, the power device has a finite off time while the saturable transformer is being reset, and the core material of the saturable transformer is not fully utilized since the changed flux is only from remanence to saturation in one direction.

SUMMARY OF THE INVENTION

Broadly, the present invention provides a drive system for a power device wherein an oscillator including a pair of devices coupled by a transformer is employed and wherein these devices are connected in a Darlington circuit arrangement with the power device and the driver devices alternately quickly driven into full conduction via the transformer coupling.

BRIEF DESCRIPTION OF THE DRAWING

FIG. 1 is a block-schematic diagram of the drive system of the present invention; and FIG. 2 is another embodiment of the present invention.

DESCRIPTION OF THE PREFERRED EMBODIMENT

Referring to FIG. 1, a drive system for a power transistor device Q1 which is shown to be of the NPN type, is illustrated. A load Z is connected between a V+ line, where a positive operating voltage is applied, and the collector electrode of the power transistor Q1. Current is supplied to the load Z when the transistor Q1 is conductive with the emitter electrode of the transistor Q1 being connected to a negative line V−, where a negative operating voltage is applied.

An oscillator circuit X including a pair of transistors Q2 and Q3 and a saturable transformer TX1 is provided for supplying the drive current to the base-emitter circuit of the power transistor Q1. The oscillator X comprises a free running, saturating core type of oscillator which is not self-starting. The driver transistors Q2 and Q3 are both of the NPN type and have their emitter electrodes commonly connected to the base electrode of the power transistor Q1 in a Darlington circuit arrangement. The driver transistors Q2 and Q3 are selected to be of such a rating to supply sufficient base drive circuit for the transistor Q1 when rendered respectively conductive.

Assume initially that the oscillator X is inoperative with both driver transistors Q2 and Q3 being in a non-conductive state. With no drive current being supplied to the transistor Q1, it also will be non-conductive. In order to start oscillation of the oscillator X, a start pulse Vo of sufficient positive polarity to turn on the transistor Q2 is supplied to the base electrode of the transistor Q2 from a pulse source PS. With the turning on of the transistor Q2, a current path is provided for a winding W1 of the saturable transformer TX1 from the V+ line, the load Z, the junction J1, the winding W1 (into the dotted end thereof), the collector-emitter circuit of the transistor Q2 and the base-emitter circuit of the power transistor Q1 to the V− line. Due to the current being applied into the dotted end of the winding W1, the dotted end of a winding W2 of the transformer TX1 will become positive. The dotted end of winding W2 is connected via the anode-cathode circuit of a diode D1 to the base of the transistor Q2 and has its undotted end connected to the emitter electrode of the transistor Q2. The winding W2 will thus supply a positive feedback voltage across the base-emitter circuit of the driver transistor Q2 thereby rapidly driving the transistor Q2 into full conduction. The diode D1 is so-poled to prevent the start pulse Vo from being applied to the winding W2.

The transistor Q3 remains non-conductive with no current being supplied through a winding W3 of the transformer TX1 connected between the load Z and the collector of the transistor Q3 with the dotted end toward the collector electrode. A winding W4 has its undotted end connected via the anode-cathode circuit of a diode D2 to the base electrode of the transistor Q3 and the dotted end connected to the emitter of the transistor Q3. Thus with current into the dotted end of the winding W1, a negative voltage will appear at the undotted end of the winding W4 which will maintain the transistor Q3 in its turned off condition.

With the transistor Q2 being driven rapidly into full conduction, the power transistor Q1 will receive ample drive current to the base electrode thereof driving the power transistor Q1 into full conduction and thereby supplying load current to the load Z. Due to the Darlington connection between the transistors Q2 and Q1, a turn on current gain of at at least 50 to 100 can be expected between the start pulse current applied to transistor Q2 and the load current.

The transistor Q2 will continue to conduct and supply drive current to the power transistor Q1 until the saturable transformer TX1 saturates due to current flow into the dotted end of the winding W1 in the positive direction of saturation. When the transformer TX1 saturates the voltage across the winding W2 will go to zero thereby removing base drive from the transistor Q2 causing it to turn off. However, due to the decay of flux in the transformer TX1, the undotted end of the winding W4 will become positive thereby supplying base drive current via the diode D2 to cause the transistor Q3 to be turned on. The diode D2 in the base circuit of the transistor Q3 is employed to match the diode D1 in the base circuit of the transistor Q2 so that the oscillator X will have equal half-cycles of oscillation.

With the turning on of the transistor Q3, a current path will be provided through the winding W3 into the undotted end thereof and the collector-emitter circuit of the transistor Q3 and the base-emitter circuit of the transistor Q1 to the V− line. Due to the dot convention between the windings W3 and W4, positive feedback will be provided therebetween so that a positive voltage will be applied from the winding W4 across the base-emitter circuit of the transistor Q3 thereby driving it quickly into full conduction for supplying full base-emitter drive current to the transistor Q1.

It should be noted that the transistor Q1 remains continuously conductive without interruption of load current to the load Z. This is due to the fact that with the transistor Q2 turning off the transistor Q3 is turned on to supply the necessary base drive current to the power transistor Q1. It should also be noted that the transistor Q2 is connected in a Darlington circuit arrangement to the transistor Q1 so as to provide ample base drive current to the power transistor Q1.

With the junction J1, of the windings W1 and W3 being connected to the load Z, the base current supplied to the transistor Q1 is proportional to the load current. Accordingly, as the load current increases the base drive current will increase and conversely decrease with decreasing load current. Moreover, it can be seen that the base drive current for the power transistor Q1 is substantially independent of magnitude of the supply voltage between the V+ and V− lines, since the drive current is supplied by the conductive one of the transistor pair Q2–Q3, which are both rapidly driven into full conduction due to the positive feedback connections of the windings W1–W2 and W3–W4, respectively, of the saturable transformer TX1.

The transistor Q3 will remain in conduction and the transistor Q2 will remain out of conduction until the saturable transformer TX1 saturates in the negative direction. When this occurs, the drive to the base of the transistor Q3 will be reduced to zero with the transistor Q3 thereby being rendered non-conductive. With the flux in the transformer decaying toward a remanence level, a positive voltage appears at the dotted end of the winding W2 which provides a positive voltage across base-emitter circuit of the transistor Q2 thereby turning this transistor on. Current is then supplied into the dotted end of the winding W1, and, in the manner as described above, due to the positive feedback between the windings W1 and W2, the transistor Q2 will be rapidly driven into full conduction with the transistor Q2 then supplying the necessary base drive current for the power transistor Q1.

This then completes a full cycle of operation. The transistors Q2 and Q3 each connected in a Darlington circuit arrangement with the power transistor Q1 alternately supply the base drive current thereto so that the power transistor Q1 continuously is maintained in conduction for supplying load current to the load Z with a 100 percent duty cycle as long as the oscillator X continues to oscillate.

It should be noted that the core material of the saturable transformer TX1 is fully utilized since the transformer is alternately driven into positive and negative saturation. This affords optimum usage of the core material of the transformer TX1. Note also that the current required to be carried by the windings W2 and W4 of the transformer TX1 is only the base-emitter current of the power transistor Q1 as opposed to a circuit arrangement where the full load current is supplied to a winding of the transformer for inducing a positive feedback in the base circuit of the power transistor.

In order to stop the flow of load current to the load Z and the power transistor Q1, it is necessary only that oscillation of the oscillator X be terminated. This is accomplished through the use of a stop transistor Q4 which is of the NPN type and which has the collector electrode thereof connected via a diode D3 to the junction point of the anode of the diode D1 and the dotted end of the winding W2 and via a diode D4 to the junction point of the anode of the diode D2 and the undotted end of the winding W4. The emitter of the stop transistor Q4 is connected to the V− line. The transistor Q4 is normally in a non-conductive state when the oscillator X is oscillating. By supplying a positive polarity stop pulse Vt from the pulse source PS to the base electrode of the stop transistor Q4, the transistor Q4 is turned on which removes the base drive from the conductive one of the transistor pair Q2–Q3 by establishing substantially a short circuit across the base-emitter circuit thereof and also across the base-emitter circuit of the power transistor Q1. Thus, with removal of base drive current to the conductive one of the transistor pair Q2–Q3, this transistor will be rendered non-conductive with the other transistor of the pair remaining in a non-conductive state. No base drive current will be supplied to the power transistor Q1 which will accordingly terminate conduction.

The transistor Q4 is remained in a conductive condition until the flux of the transformer TX1 has had sufficient time to fall to a remanence flux level. At this time, the stop pulse Vt may be removed from the transistor Q4 which will then turn off. However, the oscillator X will remain in its turned off inoperative state since it is not self-starting. The oscillator X will remain inoperative until a start pulse Vo is again applied to the base of the driver transistor Q2. A very high turn off current gain of 500 to 1,000 is obtained through the use of the stop transistor Q4 with a load current of 500 to 1,000 times the magnitude of the current of the stop pulse Vt capable of being interrupted by turning on the transistor Q4.

It should be noted also that the power transistor Q1 can be eliminated from the circuit of FIG. 1 and still provide a highly effective self-drive system for the transistors Q2 and Q3. This configuration is shown in FIG. 2 and operates identically to that of FIG. 1 except that the transistor Q1 has been eliminated so that full load current passes through the junction J1 and the winding W1 or W1 and the collector-emitter circuit of the conductive transistor, the pair Q2–Q3. Self-drive is provided for the transistors Q2 and Q3 by the positive current feedback technique as described above.

It should be understood that all of the transistors as utilized in the present system could be of the PNP type with the appropriate changes of the supply polarities.

In summary, the present invention provides a unique power device drive system having among its advantages the following:

1. the base drive current for the power transistor is substantially independent of supply voltage;
2. the base drive current for the power transistor is proportional to the load current;
3. the saturable transformer core material is fully utilized;
4. through the use of the start and stop pulses, a turn on current gain of at least 50 to 100 is obtained and a turn off current gain of 500 to 1,000 is obtained;
5. the duty cycle of the power transistor may be 100 percent;
6. the windings of the saturable transformer supplying the base electrodes of the driver transistor pair need only carry the base-emitter current of the power transistor as opposed to the full load current.

We claim as our invention:

1. In a drive system for a power device supplying a load from a source of operating current the combination of:
   an oscillator circuit including
   a pair of devices, and
   transformer means operatively coupling said pair of devices in such a manner to alternatively drive one device into full conduction and the other out of conduction,
   each of said pair of devices connected in a Darlington circuit arrangement with said power device to supply continuous drive current thereto when respectively conductive, said power device comprises a power transistor including base, collector and emitter electrodes, said pair of devices comprises a pair of transistors each including base, collector and emitter electrodes, said emitter electrodes of said pair of transistors are commonly connected to the base electrode of said power transistor, said transformer means comprises a saturable transformer including a first and second winding,
   said first and second windings being so wound with respect to one another that when one of said pair of devices is rendered conductive a signal of such a polarity is provided to drive it quickly into full conduction, which is maintained until said saturable transformer saturates, thereby removing drive current from the conductive of said pair of devices and supplying drive current to the previous non-conductive of said pair of devices and driving it into full conduction in the same manner as the previously conductive of said pair of devices, said first winding is operatively connected between said collector electrodes of said pair of transistors so that base drive current is supplied through the collector-emitter circuit of the conductive one of said pair of transistors to the base-emitter circuit of said power transistor, and said second winding is operatively connected between said base electrodes of said pair of transistors for supplying base drive current respectively thereto, said first winding supplied with current from said source via said load, and said base drive current supplied to said power transistor being proportional to the load current, said first winding includes first and second winding sections, and said second winding includes first and second winding sections, said first winding sections of said first and second windings and said second sections of said first and second windings are respectively wound with respect to one another so that one of said pair of transistors is alternately driven into full conduction and the other out of conduction, said first winding is supplied with current from said source via said load at a point between said first and second winding sections thereof.

2. In a drive system for supplying a load from a source of operating current the combination of:

an oscillator circuit including a pair of devices each including control and output electrodes, transformer means comprising a saturable transformer including a first winding operatively connected between respective output electrodes of said pair of devices, and a second winding operatively connected between respective control electrodes of said pair of devices, said first and second windings being so wound with respect to one another that when one of said pair of devices is rendered conductive a signal of such a polarity is provided to the control electrode thereof to drive it quickly into full conduction, which is maintained until said saturable transformer saturates, thereby removing drive current from the conductive of said pair of devices and supplying drive current to the previous non-conductive of said pair of devices and driving it into full conduction in the same manner as the previously conductive of said pair of devices, a power device having a control electrode and an output electrode, each of said pair of devices connected in a Darlington circuit arrangement with said power device to continuously supply drive current to said power device when respectively conductive, said load being operatively connected between said source and said first winding so that current is supplied to said load through said power device when said pair of devices are respectively conductive, means for starting oscillation of said oscillator circuit, and means for stopping oscillation of said oscillator circuit.

3. In a drive system for supplying a load from a source of operating current the combination of:

an oscillator circuit including a pair of devices each including control and output electrodes, and transformer means comprising a saturable transformer including a first winding operatively connected between respective output electrodes of said pair of devices, and a second winding operatively connected between respective control electrodes of said pair of devices, said first and second windings being so wound with respect to one another that when one of said pair of devices is rendered conductive a signal of such a polarity is provided to the control electrode thereof to drive it quickly into full conduction, which is maintained until said saturable transformer saturates, thereby removing drive current from the conductive of said pair of devices and supplying drive current to the previous non-conductive of said pair of devices and driving it into full conduction in the same manner as the previously conductive of said pair of devices, said load operatively connected between said source and said first winding so that current is supplied to said load through the conductive of said pair of devices;

means for starting oscillation of said oscillator circuit; and means for stopping oscillation of said oscillator circuit by rendering the conductive of said pair of devices non-conductive.

4. The combination of claim 3 wherein:

said first winding includes first and second winding sections, and said second winding includes first and second winding sections, said first winding sections of said first and second windings and said second sections of said first and second windings are respectively wound with respect to one another so that one of said pair of transistors is alternately driven into full conduction and the other out of conduction, said load is operatively connected between said source and a point between said first and second winding sections of said first winding.

5. In a drive system for a power device having a control and output electrode supplying a load from a source of operating current the combination of:

an oscillator circuit including a pair of devices each having a control and output electrode, and transformer means comprising a saturable transformer including a first winding operably connected between respective output electrodes of said pair of devices, and a second winding operably connected between respective control electrodes above said pair of devices, said first windings means supplied with current from said source via said load, said first and second windings being so wound with respect to one another that when one of said pair of devices is rendered conductive a signal of such a polarity is provided to the control electrode thereof to drive it quickly into full conduction, which is maintained until said saturable transformer saturates, thereby removing drive current from the conductor of said pair of devices and supplying drive current to the previous non-conductive of said pair of devices and driving it into full conduction in the same manner as the previously conductive of said pair of said devices, each of said pair of devices connected in a Darlington circuit arrangement with said power device to supply continuous drive current thereto when respectively conductive.

6. The combination of claim 1 includes:

means for starting oscillation of said oscillator circuit; and means for stopping oscillation of said oscillator circuit by rendering the conductive of said pair of devices non-conductive.

7. The combination of claim 1 wherein:

said power device comprises a power transistor including base, collector and emitter electrodes, said pair of devices comprises a pair of transistors each including base, collector and emitter electrodes, said emitter electrodes of said pair of transistors are commonly connected to the base electrode of said power transistor, said first winding is operatively connected between said collector electrodes of said pair of transistors so that base drive current is supplied through the collector-emitter circuit of the conductive one of said pair of transistors to the base-emitter circuit of said power transistor, and said second winding is operatively connected between said base electrodes of said pair of transistors for supplying base drive current respectively thereto.

8. The combination of claim 7 wherein:

said first winding means is supplied with current from said source via said load, and said base drive current supplied to said power transistor is proportional to the load current.

9. The combination of claim 8 wherein:

said first winding includes first and second winding sections, and said second winding includes first and second winding sections, said first winding sections of said first and second windings and said second sections of said first and second windings are respectively wound with respect to one another so that one of said pair of transistors is alternately driven into full conduction and the other out of conduction, said first winding is supplied with current from said source via said load at a point between said first and second winding sections thereof.

* * * * *